United States Patent
Winther Jespersen et al.

(10) Patent No.: US 9,990,123 B2
(45) Date of Patent: Jun. 5, 2018

(54) USER CONFIGURABLE TILES

(71) Applicant: Microsoft Technology Licensing, LLC, Redmond, WA (US)

(72) Inventors: Jacob Winther Jespersen, Copenhagen (DK); Jonathan Edward Davis, Charlottenlund (DK); Christian Heide Damm, Gentofte (DK); Marko Perisic, Birkerød (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 14/813,616

(22) Filed: Jul. 30, 2015

(65) Prior Publication Data

US 2017/0031577 A1 Feb. 2, 2017

(51) Int. Cl.
*G06F 3/0484* (2013.01)
*G06F 3/0482* (2013.01)

(52) U.S. Cl.
CPC ........ *G06F 3/04847* (2013.01); *G06F 3/0482* (2013.01); *G06F 3/04842* (2013.01)

(58) Field of Classification Search
CPC .............................. G06F 3/0484; G06F 3/0482
See application file for complete search history.

(56) References Cited

U.S. PATENT DOCUMENTS

| | | | |
|---|---|---|---|
| 6,995,768 B2 | 2/2006 | Jou et al. | |
| 7,716,592 B2 | 5/2010 | Tien et al. | |
| 7,925,985 B2 | 4/2011 | Moore | |
| 8,175,911 B2 | 5/2012 | Cao et al. | |
| 8,321,806 B2 | 11/2012 | Agrusa et al. | |
| 9,535,575 B1* | 1/2017 | Labaj | .................. G06F 17/3007 |
| 2005/0273352 A1 | 12/2005 | Moffat et al. | |
| 2006/0044307 A1 | 3/2006 | Song | |
| 2006/0167704 A1* | 7/2006 | Nicholls | .......... G06Q 10/06393 |
| | | | 705/7.39 |
| 2012/0218254 A1 | 8/2012 | Abeln | |
| 2013/0326412 A1 | 12/2013 | Treiser | |
| 2014/0043337 A1 | 2/2014 | Cardno | |
| 2014/0082025 A1 | 3/2014 | Armitage | |
| 2014/0344728 A1* | 11/2014 | Tuukkanen | ........ G01C 21/3664 |
| | | | 715/763 |
| 2014/0380210 A1 | 12/2014 | Blyumen et al. | |
| 2015/0100813 A1* | 4/2015 | Han | ......................... G09G 5/02 |
| | | | 713/340 |
| 2015/0106360 A1* | 4/2015 | Cao | ................... G06F 17/30716 |
| | | | 707/723 |

(Continued)

OTHER PUBLICATIONS

"Power BI", Retrieved on: May 29, 2015 Available at: http://powerbi.microsoft.com/?WT.srch=1&WT.mc_id=SEM_GOO_INEvergreenSearch_Cloud_Cloud|Google|SEM|DI|Business%20Intelligence|Nonbrand|IN_MSFT.

(Continued)

*Primary Examiner* — David Choi
(74) *Attorney, Agent, or Firm* — Christopher J. Volkmann; Kelly, Holt & Christenson, PLLC

(57) ABSTRACT

A user configurable tile allows the user to configure a set of threshold values for a corresponding metric. When the metric is calculated by the system, it is compared against the threshold values to determine what range the calculated metric resides in. A corresponding tile is displayed, with a visual indicator that is indicative of the range that the corresponding metric resides in, relative to the one or more threshold values.

20 Claims, 10 Drawing Sheets

(56) References Cited

U.S. PATENT DOCUMENTS

| | | | |
|---|---|---|---|
| 2015/0113451 A1* | 4/2015 | Kopp | G06Q 10/00 715/764 |
| 2015/0153908 A1* | 6/2015 | Kobayashi | H04M 1/00 715/781 |
| 2016/0103592 A1* | 4/2016 | Prophete | G06F 3/04845 715/771 |
| 2017/0031577 A1* | 2/2017 | Winther Jespersen | G06F 3/04847 |

OTHER PUBLICATIONS

"10-Day Dashboard", Published on: Jan. 15, 2014 Available at: http://www.10daydashboard.com/#examples.

"Geckoboard", Retrieved on: May 29, 2015 Available at: https://www.geckoboard.com/product/#demos.

Styll, Rick, "Fast Dashboards Anywhere with SAS® Visual Analytics", In Proceedings of SAS Global Forum, May 31, 2013, 15 pages.

* cited by examiner

| Cue Name | | Low Range Style | Threshold 1 | Middle Range Style | Threshold 2 | High Range Style | Per... |
|---|---|---|---|---|---|---|---|
| Ongoing Sales Invoices | ... | None | 15.00 | Ambiguous | 30.00 | Unfavorable | ☐ |
| Ongoing Purchase Invoices | ... | None | 15.00 | Ambiguous | 30.00 | Unfavorable | ☐ |
| Sales This Month | ... | Ambiguous | 1,000.00 | None | 100,000.00 | Favorable | ☐ |
| Top 10 Customer Sales YTD | ... | Favorable | 0.50 | None | 0.90 | Unfavorable | ☐ |
| Overdue Purch. Invoice Amount | ... | None | 10,000.00 | Ambiguous | 100,000.00 | Unfavorable | ☐ |
| Overdue Sales Invoice Amount | ... | None | 10,000.00 | Ambiguous | 100,000.00 | Unfavorable | ☐ |
| Average Collection Days | ... | Favorable | 10.00 | None | 30.00 | Unfavorable | ☐ |
| Ongoing Sales Quotes | ... | None | 15.00 | Ambiguous | 30.00 | Unfavorable | ☐ |

Close

FIG. 2A

USER CONFIGURABLE TILES

BACKGROUND

Computer systems are currently in wide use. Some computer systems generate tiles for use in viewing various metrics regarding the computer system.

For example, some computer systems allow users to select tiles for displaying various metrics. When a tile is selected by a user, the computer system automatically obtains underlying data from the computing system, and calculates a metric corresponding to the tile. The computing system displays the tile with a numeric indicator that indicates the value of the metric it has calculated, based upon the underlying data. When the underlying data changes, the system recalculates the metric to update the numerical indicator.

Some users, however, select a relatively large number of tiles for display. It can be difficult for a user to keep track of what the various individual numeric indicators are actually indicating. Therefore, it can be difficult for a user to determine whether a numerical indicator is indicating that the computing system is performing well, average, poorly, etc.

This problem can be further exacerbated when the user is viewing tiles on a mobile device, or another device that has relatively limited display real estate. The tiles can be relatively small, or the display can be cumbersome.

The discussion above is merely provided for general background information and is not intended to be used as an aid in determining the scope of the claimed subject matter.

SUMMARY

A user configurable tile allows the user to configure a set of threshold values for a corresponding metric. When the metric is calculated by the system, it is compared against the threshold values to determine what range the calculated metric resides in. A corresponding tile is displayed, with a visual indicator that is indicative of the range that the corresponding metric resides in, relative to the one or more threshold values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2A is one example of a configuration user interface display.

DETAILED DESCRIPTION

Figure 1:
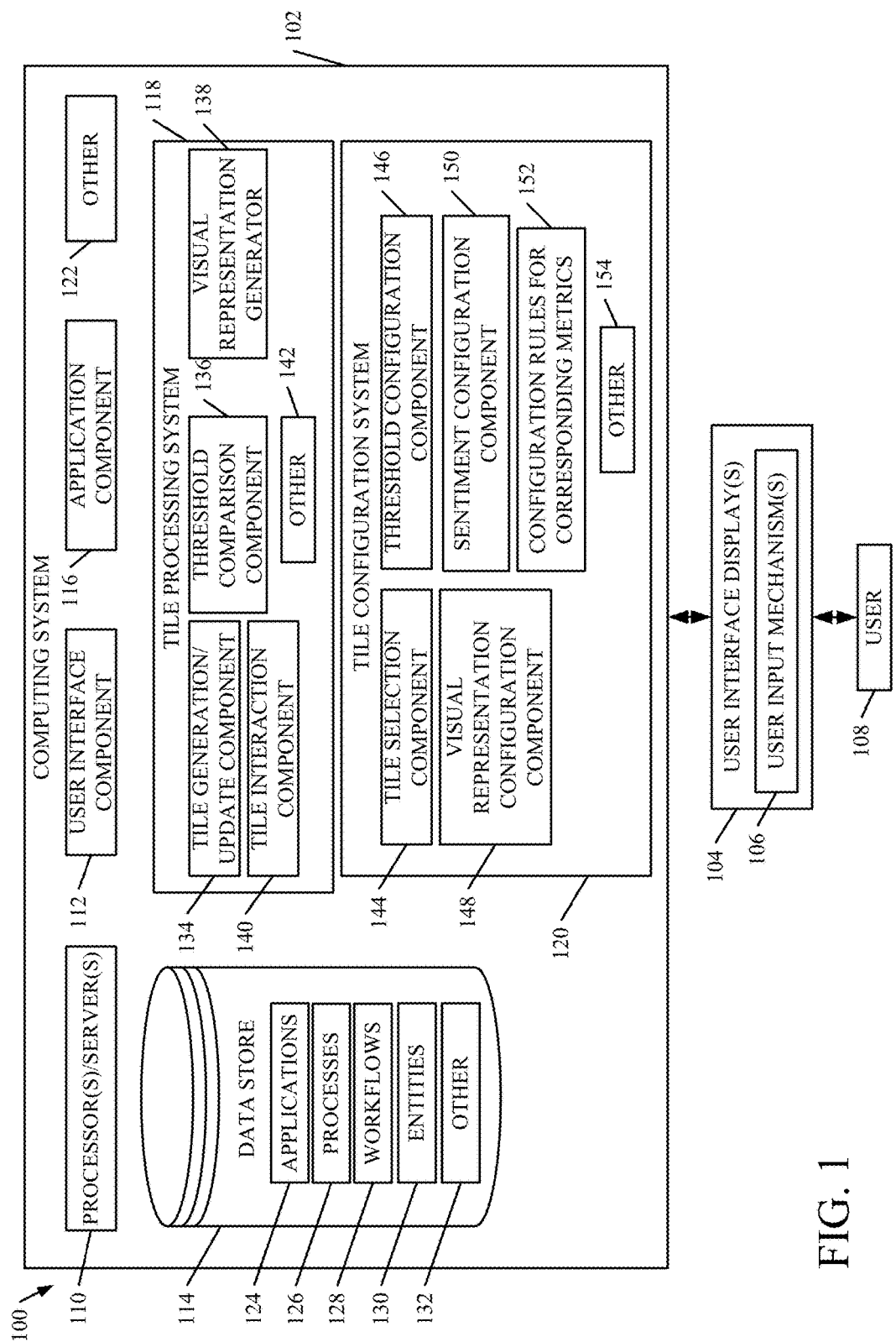
FIG. 1 is a block diagram of one example of a computing system architecture.

FIG. 1 is a block diagram of one example of a computing system architecture 100. Architecture 100 illustratively includes computing system 102 that generates user interface displays 104 with user input mechanisms 106 for interaction by user 108. User 108 illustratively interacts with user input mechanisms 106 in order to control and manipulate computing system 102.

In the example shown in FIG. 1, computing system 102 illustratively includes processors or servers 110, user interface component 112, data store 114, application component 116, tile processing system 118, tile configuration system 120, and it can include other items 122. Data store 114, itself, can include applications 124, processes 126, workflows 128, entities 130, and it can include a wide variety of other items 132. Tile processing system 118 can include tile generation/update component 134, threshold comparison component 136, visual representation generator 138, tile interaction component 140, and it can include other items 142. Configuration system 120 illustratively includes tile selection component 144, threshold configuration component 146, visual representation configuration component 148, sentiment configuration component 150, a set of configuration rules for corresponding metrics 152, and it can include other items 154.

In one example, application component 116 runs applications 124 in order to perform processes 126, workflows 128, etc. In doing so, it illustratively operates on entities 130 and other records 132. Entities 130 can represent items within computing system 102. For instance, a customer entity can represent a customer. An electronic mail message entity can represent an electronic mail message. A product entity can represent a product, etc. This is only a small number of examples of the various items that can be represented by entities 130.

In one example, tile processing system 118 makes various tiles available for viewing by user 108. A user can illustratively select which tiles the user wishes to view, and may also be able to select the various pages, within the application, on which the user wishes the tiles to be displayed. In one example, all of the selected tiles are displayed on a single page, such as the start page, of the application. In other examples, different files can be "pinned" to different pages for display on those pages.

Tile configuration system 120 illustratively allows user 108 to set various threshold values for a given tile. For instance, the tile may illustratively display a numeric value indicative of a metric that is calculated by the system based on the processes 126, workflows 128, etc. that are performed by application component 116, in running an application. Configuration system 120 also allows the user to specify a visual indicator that is displayed when the metric value meets or exceeds the various thresholds that have been set. Then, during runtime, tile processing system 118 calculates the metric values for the various tiles that are displayed to user 108 and compares them against the configured threshold values. It then controls user interface component 112 to display the tiles with the visual representation configured by the user, based upon where the metric value resides relative to the thresholds set by the user.

More specifically, tile selection component 144 in configuration system 120 allows user 108 to select the tile for configuration. Threshold configuration component 146 allows the user to configure one or more different threshold values for the corresponding tile. Visual representation configuration component 148 allows the user to configure a desired visual representation for the tile, and sentiment configuration component 150 allows the user to assign a sentiment to each metric range defined by the various thresholds. These configuration values are saved as configuration rules for the corresponding metrics.

Generation/update component 134 in tile processing system 118 illustratively calculates the metric values for the various tiles, during runtime. It can do so continuously, or intermittently. It can also be triggered to calculate those values when an item of underlying data that affects the values has changed. In doing so, it illustratively accesses information generated by application component 116 in running applications 124, in performing processes 126 or workflows 128, etc. Once the metric values for the various tiles have been generated, threshold comparison component 136 compares those values against thresholds set by the user, and visual representation generator 138 generates a visual representation of the tile based upon where the metric value falls relative to the thresholds. Tile interaction component 140 detects user interaction with the tile and performs various actions based on the detected user interaction.

Figure 2:
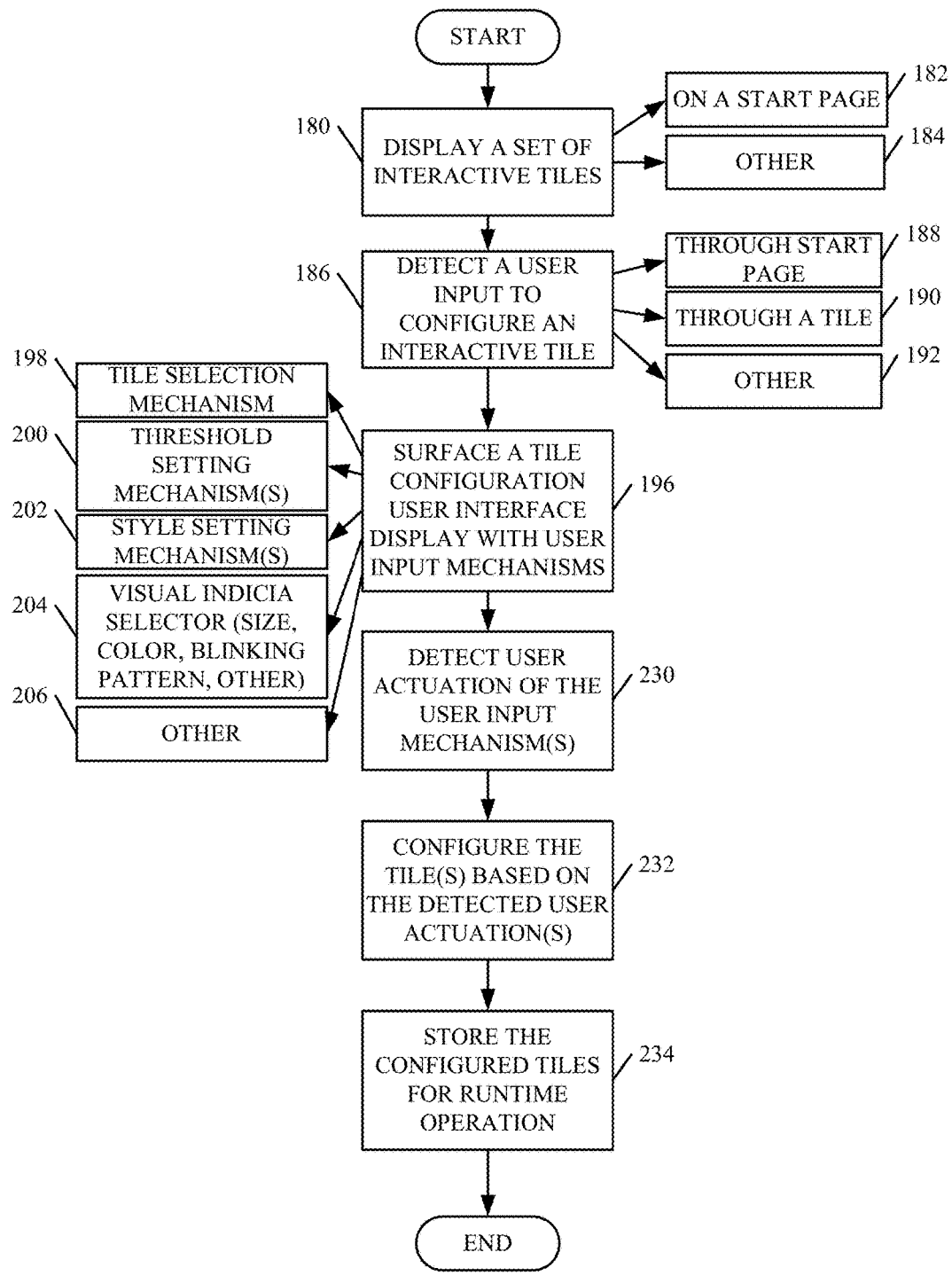
FIG. 2 is a flow diagram illustrating one example of the operation of the architecture shown in FIG. 1, in allowing a user to configure a tile.

FIG. 2 is a flow diagram illustrating one example of the operation of configuration system 120, in more detail. It is first assumed that a set of interactive tiles are displayed so that user 108 can view them. This is indicated by block 180 in FIG. 2. As briefly mentioned above, they can be displayed on a start page 182, or in any other of a wide variety of ways 184.

Tile configuration system 120 then detects a user input that indicates that the user wishes to configure an interactive tile. This is indicated by block 186 in FIG. 2. For instance, the user can navigate through a set of menu options from the start page, as indicated by block 188. In another example, the user can indicate that the user wishes to configure a tile, by actuating a suitable mechanism on the tile. This is indicated by block 190. The user can provide other inputs to indicate that the user wishes to configure a tile as well, and this is indicated by block 192.

Tile configuration system 120 then surfaces a tile configuration user interface display with a set of configuration user input mechanisms. This is indicated by block 196. The user input mechanisms can include, for instance, a tile selection mechanism 198 that allows the user to select a tile for configuration. It can include a set of threshold setting mechanisms 200 that allow the user to set various thresholds. It can include a style setting mechanism 202 that allows the user to set a style associated with the different ranges defined by the thresholds. It can include a visual indicia selector 204 that identifies particular visual indicia that the user wishes to see based upon the range that the metric values falls in. By way of example, if the operator wishes to be alerted to a metric value falling in a given range, the user may select that the visual representation be in a red color, be blinking or animated in another way, be a relatively large size, etc. The user input mechanisms can take a wide variety of other forms as well, and this is indicated by block 206.

FIG. 2A shows one example of a user interface display 208 that can be used to configure a tile. It can be seen in FIG. 2A that user interface display 208 includes a set of rows, divided into columns. Each row illustratively represents a tile that can be configured. The rows include name row 210, a set of threshold rows 212 and 214, and a set of range rows 216, 218 and 220. The user can select one of the rows to configure the corresponding tile. When the user selects a cell in a given row, that cell illustratively becomes editable.

For instance, the user may edit the cell by selecting an item from a drop down menu that is displayed when the user actuates the cell for editing (e.g., when the user clicks on, taps, or otherwise actuates, the cell). In another example, the user may type in a value into each cell. Of course, these are only two ways for editing a cell, and others can be used as well.

It can be seen in the example shown in FIG. 2A that row 222 corresponds to a tile that displays a metric indicative of "Average Collection Days". The first threshold value in column 212 is set to 10 days and the second threshold value in column 214 is set to 30 days. Thus, the two threshold values define three ranges. A low range in column 216 (where the average collection is received in 10 days or less), a middle range in column 218 (where the average collection is received between 10 and 30 days), and a high range in column 220 (where the average collection is received in 30 days or more).

Thus, when the user actuates the threshold cell in column 212, the user can illustratively edit that cell to set a threshold number of days. When the user actuates the threshold cell in column 214, the user can do the same. When the user actuates the cell in the low range style column 216, the user can illustratively set a desired style to be displayed on the tile when the metric falls in that range. In one example, the style represents the sentiment associated with that range. In the example shown in FIG. 2A, for instance, when the average collections are in the low range, that represents a favorable sentiment. When they are in the high range, that represents an unfavorable sentiment. The corresponding tile will be displayed with a visual indicator that indicates whether the metric on the tile is favorable, neutral, or unfavorable. By way of example, when the metric is in the favorable range, a bar may be displayed on the tile that is colored green. When it is in the unfavorable range, a bar may be displayed on the tile that is colored red. Of course, the visual representation can have different forms as well, as will be discussed in greater detail below with respect to FIGS. 3 and 3A.

Referring again to the flow diagram of FIG. 2, tile configuration system 120 illustratively detects user inputs configuring the tile. This is indicated by block 230. For instance, the threshold configuration component 146 can detect user inputs setting thresholds. The visual representation configuration component 148 or sentiment configuration component 150 can detect user actuations setting the type of visual representation to be displayed, when the metric falls in each range, and the sentiment associated with that range. These inputs are illustratively saved as configuration rules for the corresponding metrics.

Tile configuration system 120 then configures the corresponding tiles based on the detected user actuations. This is indicated by block 232. It then stores the configured tiles for runtime operation, as indicated by block 234.

Figure 3:
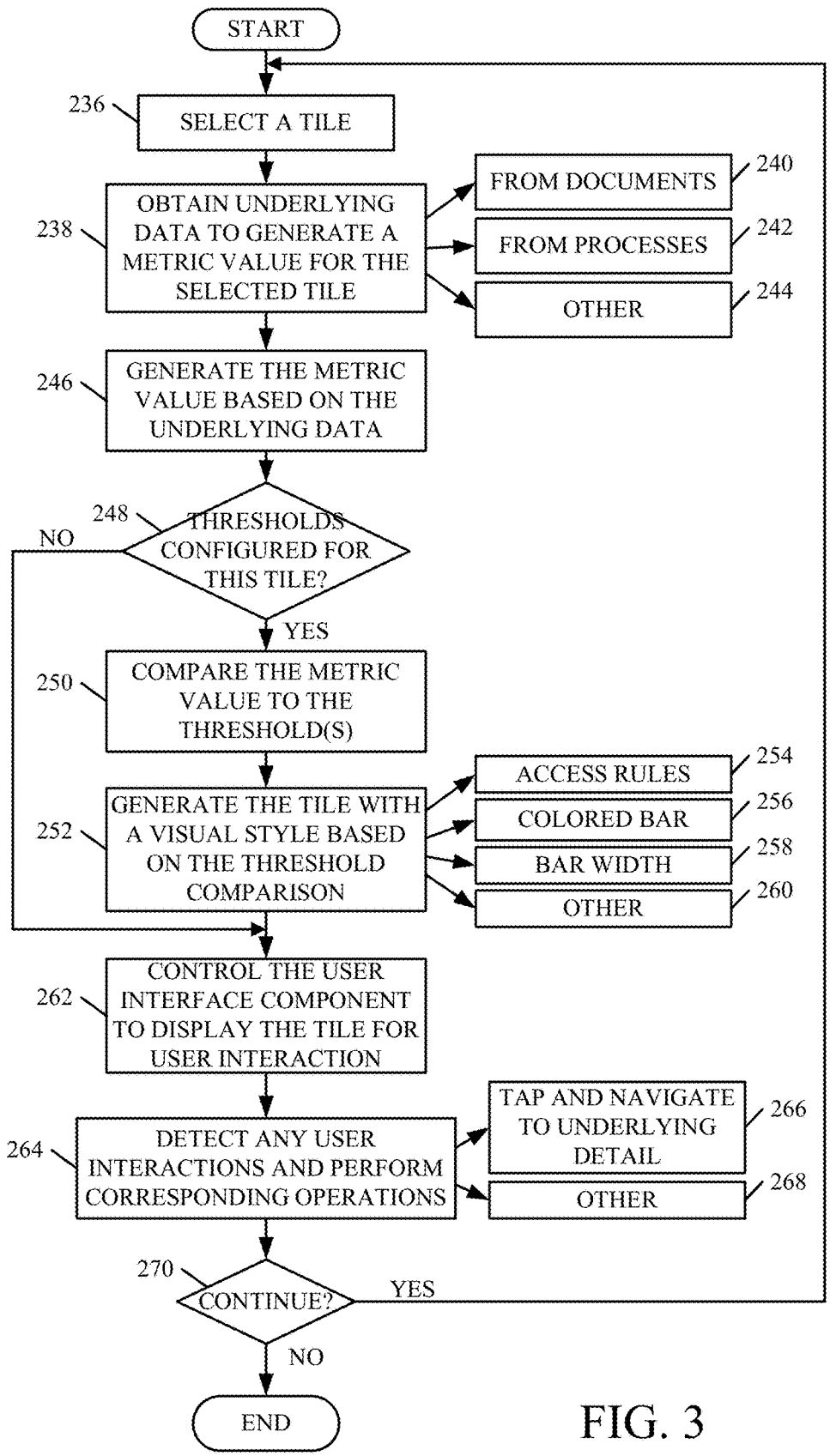
FIG. 3 is a flow diagram illustrating one example of the operation of the architecture shown in FIG. 1 in generating a runtime representation of a tile.
Figure 3A:
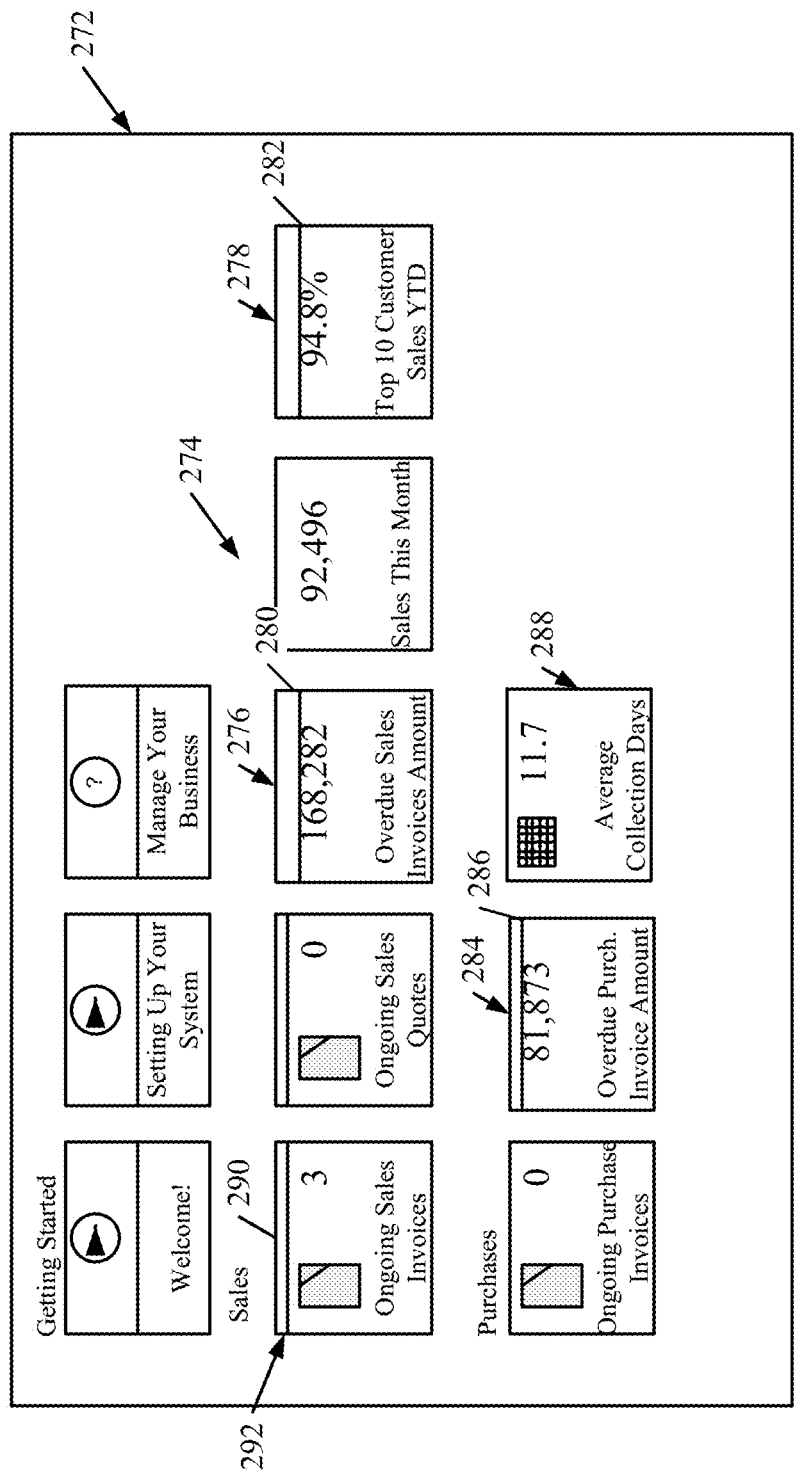
FIG. 3A is one example of a user interface display showing various tiles, with different configurations.

FIG. 3 is a flow diagram illustrating one example of the operation of the architecture shown in FIG. 1 in displaying tiles, during runtime. FIG. 3A shows various examples of tiles. Tile processing system 118 first selects a tile for which the corresponding metric is to be calculated. This is indicated by block 236 in FIG. 3. Tile generation/update component 234 then obtains the underlying data from computing system 102 in order to generate or update a metric value for the selected tile. This is indicated by block 238. This underlying data can be from documents 240, from processes or workflows (as indicated by block 242), or from a wide variety of other sources 244.

Component 134 then calculates or otherwise generates the metric value based on the underlying data. This is indicated by block 246.

Threshold comparison component 136 then determines whether any thresholds have been configured for the selected tile. This is indicated by block 248. If so, then it compares the metric value, that was just calculated, to the threshold values that have been configured for this tile. This is indicated by block 250. Visual representation generator 138 then generates the tile with a visual style based upon the threshold comparison and configuration rules 152. This is indicated by block 252. For instance, it can access the configuration rules 152 to determine what range the metric value falls in, based upon the threshold comparison, and to identify the style or sentiment associated with that range to display the tile as defined by the rules. Accessing the rules is indicated by block 254. Again, the visual style can include a wide variety of different visual indicia, such as a colored bar 256, a bar that has a varying bar width 258, or a wide variety of visual indicia 260.

Visual representation generator 138 then controls user interface component 112 to display the tile for user interaction. This is indicated by block 262. Tile interaction component 140 then detects any user interactions with the tile and performs corresponding operations. This is indicated by block 264. For instance, in one example, the user can illustratively tap or otherwise actuate the tile. This causes tile interaction component 140 to navigate the user to a representation of the underlying data that was accessed in order to generate the metric displayed on the tile. Tapping the tile and navigating to the underlying detail data is indicated by block 266. Of course, the user interactions and corresponding operations can take a wide variety of other forms as well, and this indicated by block 268.

Tile processing system 118 continues to dynamically generate metric values for each of the tiles that are displayed to the user. This continues until processing terminates (such as when the user exits the application, navigates away from the page that displays the tile, etc.). This is indicated by block 270.

FIG. 3A shows one example of a user interface display 272 that shows a variety of different tiles, with different style displays generated. Display 272 shows a set of expressive or dynamic, and interactive tiles generally at 274. In the example shown in FIG. 3A, tiles 276 and 278 illustratively have a color coded bar 280 and 282, respectively. The color coded bar has a given width and displays a color corresponding to an unfavorable sentiment. In one example, for instance, bars 280 and 282 can be red in color. Of course, they can have a wide variety of other visual indicia as well. For instance, they may be relatively wide, they may blink, they may change colors or size, etc. FIG. 3A also shows that tile 284 has a color coded bar 286 that is relatively thin, relative to bars 280 and 282. It is also color coded to indicate that it is in a neutral range. In one example, the color can be yellow or another color.

FIG. 3A also shows that in some examples, tiles may have no interactivity associated with them. For instance, if tiles 278 and 288 are not interactive, they may be greyed out.

Further, tile 290 also has a color coded bar 292. Color coded bar 292 is relatively thin (relative to bars 280, 282 and 286) and it is color coded to indicate a favorable sentiment, such as green.

A number of the other tiles (that have metric values displayed thereon) have no color bar associated with them. This may indicate that the user has not configured any thresholds or sentiment values for those tiles.

It will be appreciated, of course, that the displays shown in FIGS. 2A and 3A are only examples. A wide variety of other displays could be generated as well.

It will also be appreciated that the user configurable tiles, with visual indicia representing sentiment values associated with those tiles, provide a number of different technical advantages. The underlying computing system need not surface as much data in order for the user to see whether a given metric value is good or bad. In prior systems, some users would need to do searches or otherwise access additional information, in addition to the metric values shown on the tiles, in order to determine whether the values were good, bad, satisfactory, etc. By displaying an indicator that already indicates this, this improves the performance of the computing system because it decreases the search, processing and rendering overhead on the system.

Also, the thresholds for a given tile or metric can be set by persons who are role-specific. For instance, a manager may be able to set certain thresholds, while the manager's direct reports are able to view tiles with those thresholds, but are not able to modify those thresholds. Thus, this communicates information from the manager to his or her direct reports, without the need for additional communication mechanisms. The users can quickly and efficiently determine whether the metric values are good, satisfactory, poor, etc. in the eyes of their managers. This further increases the efficiency of the users and decreases the computing load on the system.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
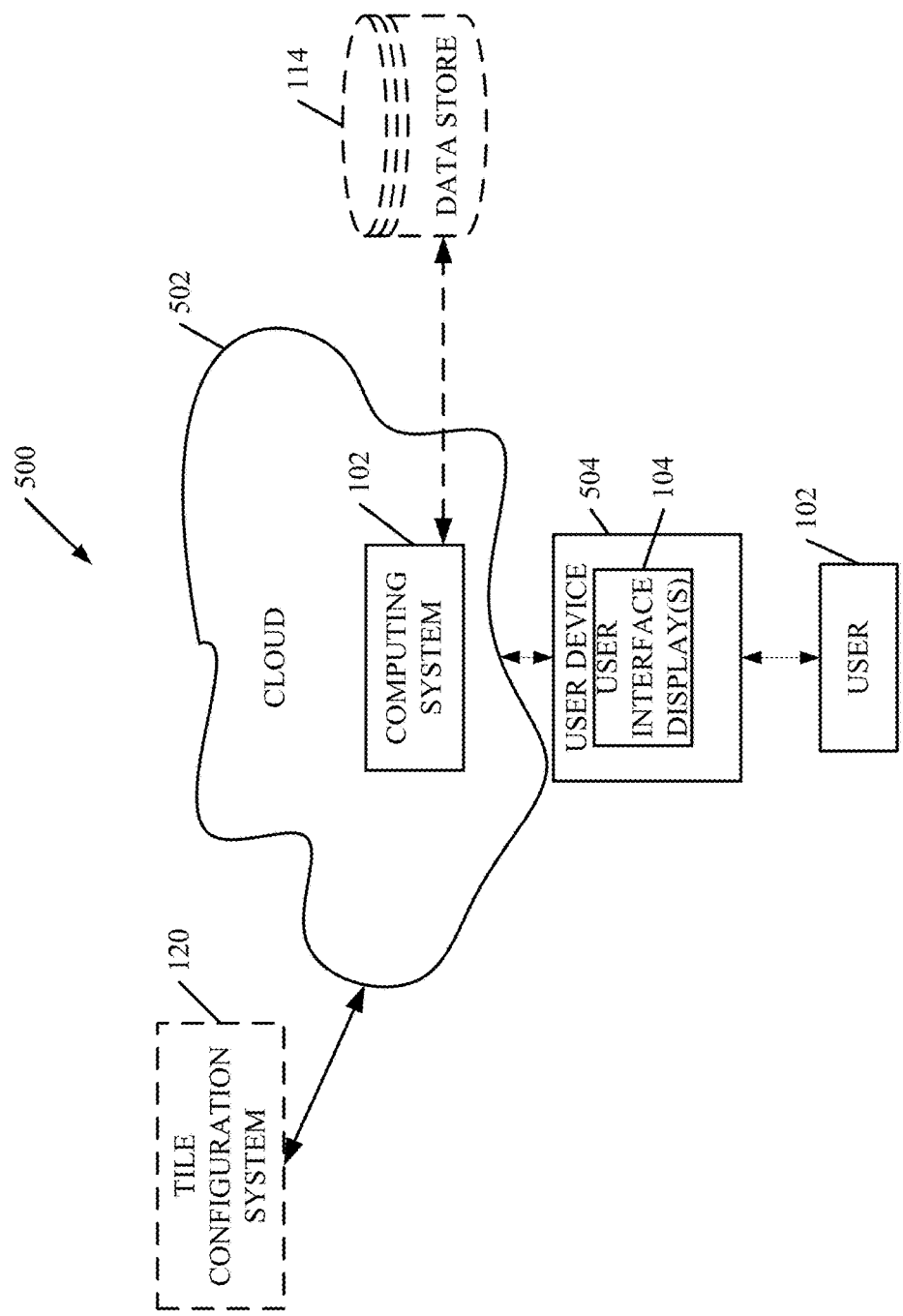
FIG. 4 shows the architecture of FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 (or parts of it) can be located in cloud 502 (which can be public, private, or a combination where portions are public while others are private). Therefore, user 108 uses a user device 504 to access those systems through cloud 502.

FIG. 4 also depicts another example of a cloud architecture. FIG. 4 shows that it is also contemplated that some elements of computing system 102 can be disposed in cloud 502 while others are not. By way of example, data store 114 can be disposed outside of cloud 502, and accessed through cloud 502. In another example, tile configuration system 120 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
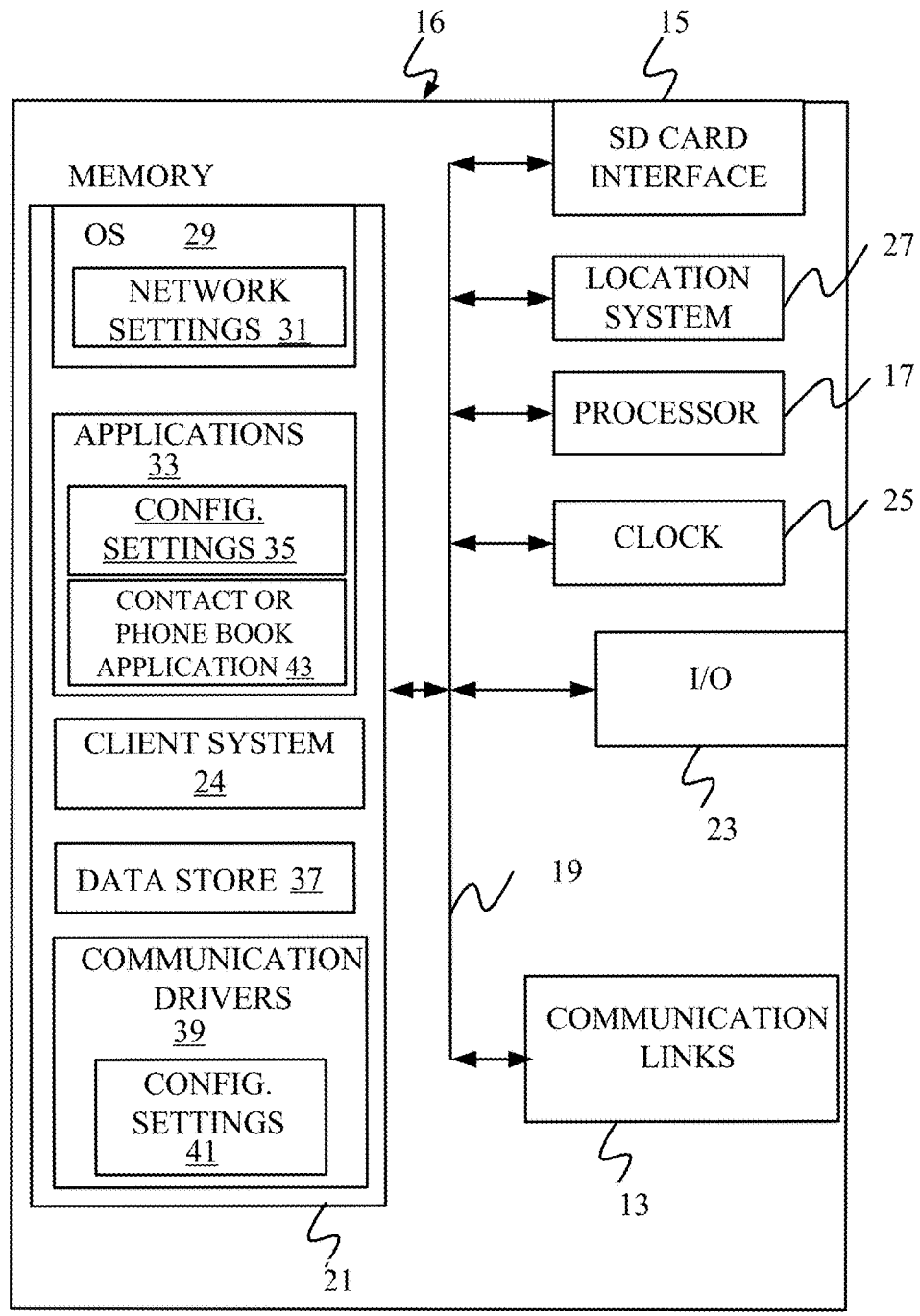
FIG. 5-7 show examples of mobile devices that can be used in the architectures of previous FIGS.
Figure 7:
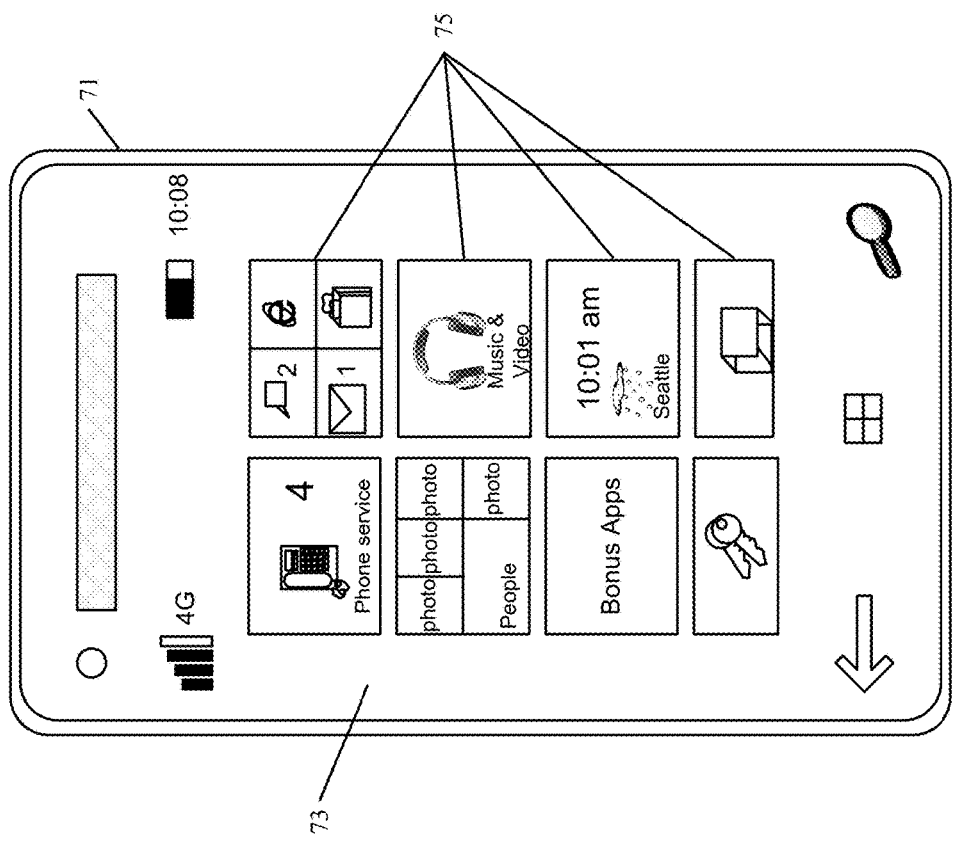
Figure 8:
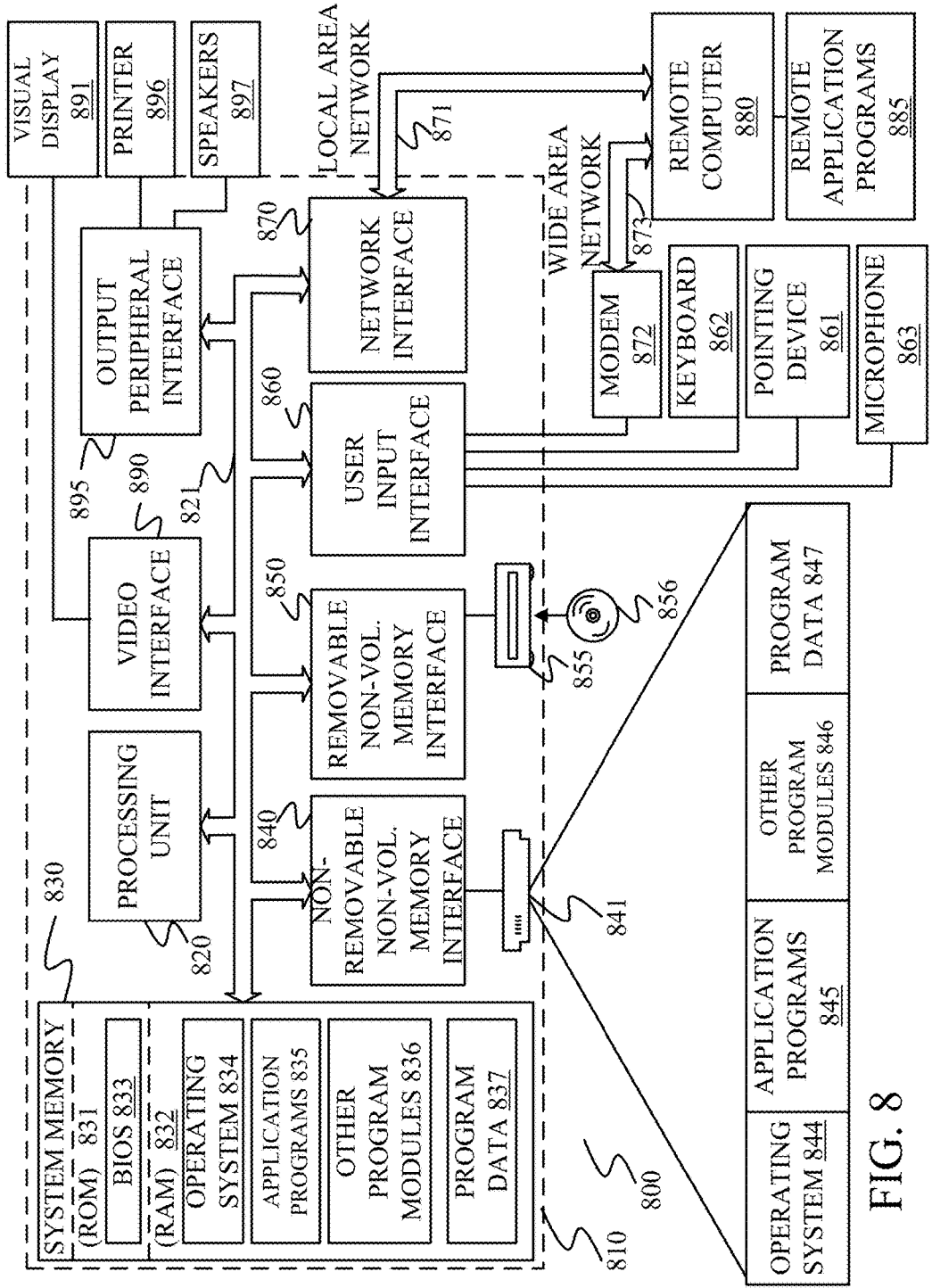
FIG. 8 is a block diagram of one example of a computing component that can be used in the architecture of the previous FIGS.

FIG. 5 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
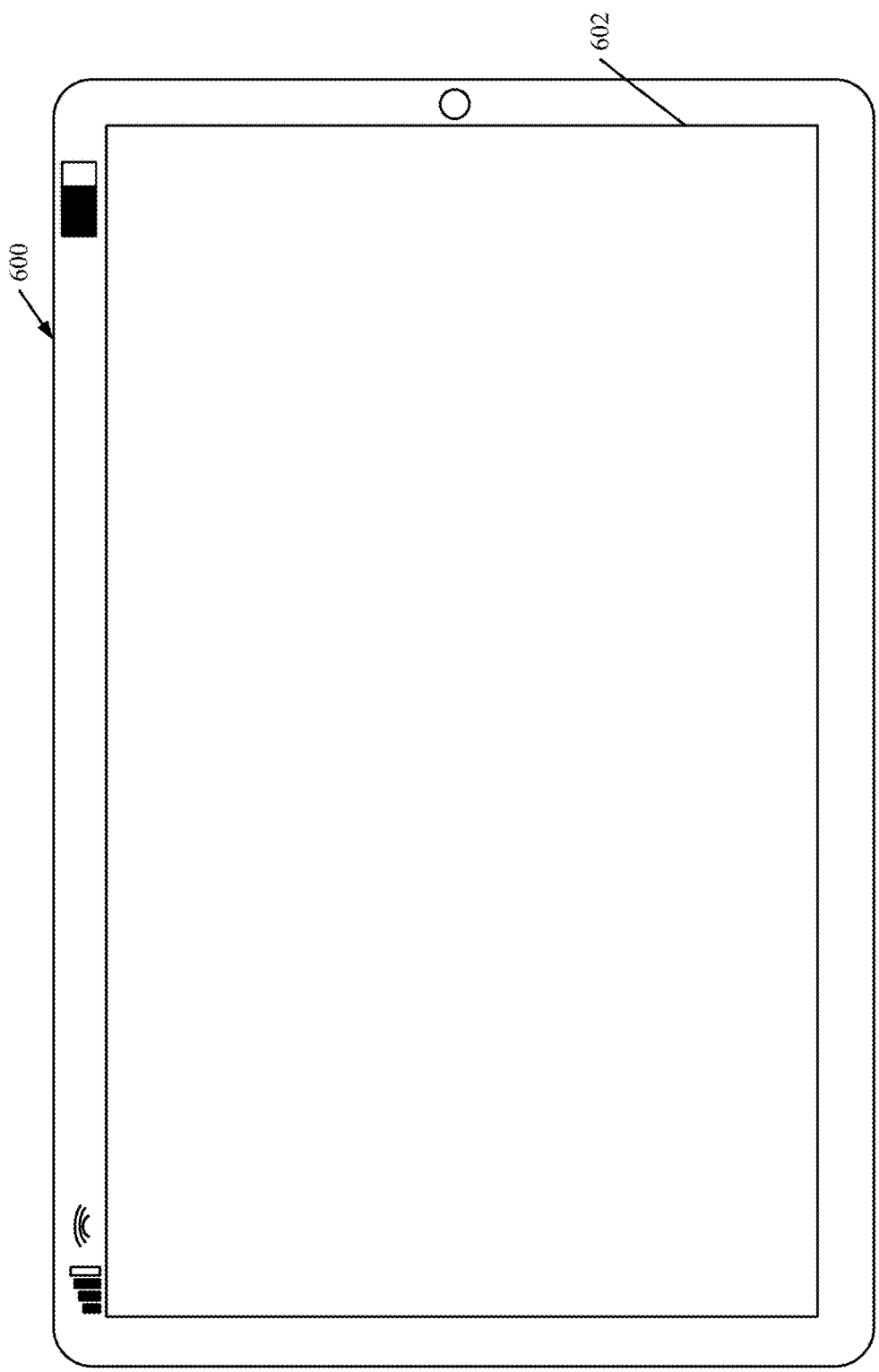

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 8 is one embodiment of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processor 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component;
a tile configuration system that controls the user interface component to surface a threshold configuration user input mechanism and that detects user actuation of the threshold configuration user input mechanism to identify a metric threshold corresponding to a metric for a given tile; and
a tile processing system that intermittently accesses underlying data corresponding to the given tile and calculates a metric value for the metric based on the underlying data, compares the metric value to the metric threshold, and controls the user interface component to surface a tile display displaying the given tile, the metric value, and visual indicia indicative of how the metric value compares to the metric threshold.

Example 2 is the computing system of any or all previous examples wherein the tile configuration system comprises:
a threshold configuration component that controls the user interface component to surface the threshold configuration user input mechanism, the metric threshold defining a plurality of ranges.

Example 3 is the computing system of any or all previous examples wherein the tile configuration system comprises:
a sentiment configuration component that controls the user interface component to surface a sentiment selection user input mechanism and detect user actuation of the sentiment selection user input mechanism to identify a sentiment corresponding to at least one of the plurality of ranges.

Example 4 is the computing system of any or all previous examples wherein the tile processing system comprises:
a threshold comparison component that compares the metric value to the metric threshold to identify which range, of the plurality of ranges, the metric value falls in.

Example 5 is the computing system of any or all previous examples wherein the tile processing system comprises:
a visual representation generator that identifies a particular visual indicia corresponding to the identified range that the metric value falls in and controls the user interface component to generate the tile display with the particular visual indicia.

Example 6 is the computing system of any or all previous examples wherein the sentiment selection user input mechanism includes a mechanism for user selection of a sentiment for each of the plurality of ranges.

Example 7 is the computing system of any or all previous examples wherein the tile configuration system comprises:
a tile selection user input mechanism that is actuated to select the given tile to be configured.

Example 8 is the computing system of any or all previous examples wherein the threshold configuration component controls the user interface component to surface a plurality of threshold configuration user input mechanisms that are actuated to define a plurality of different metric thresholds.

Example 9 is the computing system of any or all previous examples wherein the visual representation generator identifies the particular visual indicia corresponding to the identified range as a color coded bar that has a color that varies based on a sentiment corresponding to the identified range.

Example 10 is the computing system of any or all previous examples wherein the color coded bar has a size that varies based on a sentiment corresponding to the identified range.

Example 11 is the computing system of any or all previous examples wherein the tile processing system further comprises:

a tile interaction component that detects user interaction with the given tile and performs an action based on the detected user interaction.

Example 12 is the computing system of any or all previous examples wherein the tile interaction component navigates the user to the underlying data based on the user interaction.

Example 13 is a computer implemented method, comprising:

controlling a user interface component to surface a threshold configuration user input mechanism;

detecting user actuation of the threshold configuration user input mechanism to identify a metric threshold corresponding to a metric for a given tile;

intermittently accessing underlying data corresponding to the given tile;

calculating a metric value for the metric based on the underlying data;

comparing the metric value to the metric threshold; and controlling the user interface component to surface a tile display displaying the given tile, the metric value, and visual indicia indicative of how the metric value compares to the metric threshold.

Example 14 is the computer implemented method of any or all previous examples wherein detecting user actuation of the threshold configuration user input mechanism comprises:

identifying a plurality of ranges defined by the metric threshold.

Example 15 is the computer implemented method of any or all previous examples wherein controlling a user interface component to surface a threshold configuration user input mechanism comprises:

controlling the user interface component to surface a sentiment selection user input mechanism; and detecting user actuation of the sentiment selection user input mechanism to identify a sentiment corresponding to at least one of the plurality of ranges.

Example 16 is the computer implemented method of any or all previous examples wherein comparing the metric value to the metric threshold comprises:

identifying which range, of the plurality of ranges, the metric value falls in;

identifying a particular visual indicia corresponding to the identified range that the metric value falls in; and controlling the user interface component to generate the tile display with the particular visual indicia.

Example 17 is the computer implemented method of any or all previous examples wherein detecting user actuation of the sentiment selection user input mechanism comprises:

detecting user actuation of the sentiment selection user input mechanism to identify a sentiment corresponding to each of the plurality of ranges.

Example 18 is the computer implemented method of any or all previous examples and further comprising:

detecting user interaction with the given tile; and performing an action based on the detected user interaction.

Example 19 is the computer implemented method of any or all previous examples wherein performing an action comprises:

navigating the user to the underlying data based on the user interaction.

Example 20 is a computing system, comprising:

a user interface component;

a threshold configuration component that controls the user interface component to surface a threshold configuration user input mechanism and that detects user actuation of the threshold configuration user input mechanism to identify a metric threshold corresponding to a metric for a given tile, the metric threshold defining a plurality of ranges;

a sentiment configuration component that controls the user interface component to surface a sentiment selection user input mechanism and detect user actuation of the sentiment selection user input mechanism to identify a sentiment corresponding to at least one of the plurality of ranges;

a tile processing system that intermittently accesses underlying data corresponding to the given tile and calculates a metric value for the metric based on the underlying data, compares the metric value to the metric threshold, and controls the user interface component to surface a tile display displaying the given tile, the metric value, and visual indicia indicative of how the metric value compares to the metric threshold; and a tile interaction component that detects user interaction with the given tile and navigates the user to the underlying data based on the user interaction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor; and
   memory storing instructions executable by the processor, wherein the instructions, when executed, configure the computing system to:
   define a tile display having a plurality of display tiles, each display tile representing a metric based on data associated with the computing system;
   generate a representation of a tile customization user interface display that identifies the plurality of display tiles of the tile display and is configured to customize the display tiles; and
   based on an indication of a tile customization user input through the tile customization user interface display, define, for each display tile, a metric threshold corresponding to the metric represented by the display tile;
   for each display tile,
      access data corresponding to the display tile;
      based on the accessed data, calculate a metric value for the metric represented by the display tile; and
      compare the calculated metric value to the metric threshold defined for the display tile; and
   generate a representation of the tile display comprising the plurality of display tiles representing the metric values, and visual indicia indicative of how each metric value compares to the corresponding metric threshold.

2. The computing system of claim 1 wherein the metric threshold defines a plurality of ranges.

3. The computing system of claim 2 wherein the representation of the tile customization user interface display includes a sentiment selection user input mechanism, and the instructions, when executed, configure the computing system to:
based on an indication of user actuation of the sentiment selection user input mechanism, select a sentiment corresponding to at least one of the plurality of ranges.

4. The computing system of claim 3 wherein the instructions, when executed, configure the computing system to:
compare the metric value to the metric threshold to identify which range, of the plurality of ranges, the metric value falls in.

5. The computing system of claim 4 wherein the instructions, when executed, configure the computing system to:
identify a particular visual indicia corresponding to the identified range that the metric value falls in; and
generate a representation of the tile display with the particular visual indicia.

6. The computing system of claim 1, wherein the instructions, when executed, configure the computing system to:
intermittently, for each display tile:
access the data corresponding the display tile,
calculate the metric value based on the data,
compare the metric value to the metric threshold, and
modify the visual indicia based on the comparison.

7. The computing system of claim 5 wherein the representation of the tile customization user interface display includes a tile selection user input mechanism, wherein the instructions, when executed, configure the computing system to:
based on an indication of user actuation of the tile selection user input mechanism, select a particular one of the display tiles to be customized.

8. The computing system of claim 7 wherein the representation of the tile customization user interface display includes a plurality of threshold configuration user input mechanisms, and the instructions, when executed, configure the computing system to:
based on an indication of user actuation of the plurality of threshold configuration user input mechanisms, define a plurality of different metric thresholds.

9. The computing system of claim 8 wherein the instructions, when executed, configure the computing system to:
identify the particular visual indicia corresponding to the identified range as a color coded bar that has a color that varies based on a sentiment corresponding to the identified range.

10. The computing system of claim 9 wherein the color coded bar has a size that varies based on a sentiment corresponding to the identified range.

11. The computing system of claim 1 wherein the wherein the instructions, when executed, configure the computing system to:
based on an indication of user interaction with a particular one of the display tiles, navigate the user to the data corresponding to the particular display tile.

12. The computing system of claim 1, wherein the instructions, when executed, configure the computing system to:
for each display tile,
access second data corresponding to the display tile;
calculate a second metric value based on the second data; and
change the visual indicia based on a comparison of the second metric value to the metric threshold.

13. A computer implemented method, comprising:
defining a tile display have a plurality of display tiles, each display tile representing a metric based on data associated with the computing system;
generating a representation of a tile customization user interface display that identifies the plurality of display tiles of the tile display;
based on an indication of a tile customization user input through the tile customization user interface display, customizing the display tiles by defining, for each display tile, a metric threshold corresponding to the metric represented by the display tile;
for each display tile,
accessing data corresponding to the display tile;
based on the accessed data, calculating a metric value for the metric represented by the display tile; and
comparing the calculated metric value to the metric threshold defined for the display tile; and
generating a representation of the tile display comprising the plurality of display tiles representing the metric value, and visual indicia indicative of how each metric value compares to the corresponding metric threshold.

14. The computer implemented method of claim 13 and further comprising:
identifying a plurality of ranges defined by the metric threshold.

15. The computer implemented method of claim 14 and further comprising:
generating a representation of a sentiment selection user input mechanism; and
based on an indication of user actuation of the sentiment selection user input mechanism, identifying a sentiment corresponding to at least one of the plurality of ranges.

16. The computer implemented method of claim 15 wherein comparing the metric value to the metric threshold comprises:
identifying which range, of the plurality of ranges, the metric value falls in;
identifying a particular visual indicia corresponding to the identified range that the metric value falls in; and
generating the representation of the tile display with the particular visual indicia.

17. The computer implemented method of claim 15 and further comprising:
identifying a sentiment corresponding to each of the plurality of ranges.

18. The computer implemented method of claim 13 and further comprising:
receiving an indication of user interaction with a particular one of the display tiles; and
performing an action based on the indication of the user interaction.

19. The computer implemented method of claim 18 wherein performing an action comprises:
navigating the user to the underlying data.

20. A computing system, comprising:
a tile display definition component configured to:
define a tile display have a plurality of display tiles, each display tile representing a metric based on data associated with the computing system;

a tile customization component configured to:
  generate a representation of a tile customization user interface display that identifies the plurality of display tiles of the tile display and is configured to customize the display tiles; and
  based on an indication of a tile customization user input through the tile customization user interface display, for each display tile,
    define, for each display tile, a metric threshold corresponding to the metric represented by the display tile, the metric threshold defining a plurality of ranges; and
    based on an indication of a sentiment selection user input, identify a sentiment corresponding to at least one of the plurality of ranges;
a tile processing system configured to:
  for each display tile,
    access data corresponding to the display tile;
    based on the accessed data, calculate a metric value for the metric represented by the display tile; and
    compare the calculated metric value to the metric threshold defined for the display tile; and
  generate a representation of the tile display comprising the plurality of display tiles representing the metric values, and visual indicia indicative of how each metric value compares to the corresponding metric threshold; and
a tile interaction component configured to:
  based on an indication of user interaction with a particular one of the display tiles, navigate the user to the data corresponding to the particular display tile.

* * * * *